(12) United States Patent
Pandita et al.

(10) Patent No.: US 8,948,995 B2
(45) Date of Patent: Feb. 3, 2015

(54) PRECEDING VEHICLE STATE PREDICTION

(75) Inventors: Rohit Pandita, Ann Arbor, MI (US);
Derek Stanley Caveney, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 227 days.

(21) Appl. No.: 13/535,513

(22) Filed: Jun. 28, 2012

(65) Prior Publication Data

US 2014/0005906 A1    Jan. 2, 2014

(51) Int. Cl.
  *B60T 7/12*  (2006.01)
  *G05D 1/00*  (2006.01)
  *G06F 7/00*  (2006.01)
  *G06F 17/00* (2006.01)

(52) U.S. Cl.
  USPC ............. 701/96; 701/117; 701/118; 701/119; 701/482; 180/168

(58) Field of Classification Search
  USPC ............. 701/1, 23, 24, 36, 96, 117, 118, 119, 701/482; 340/434, 435, 988; 180/168
  See application file for complete search history.

(56) References Cited

U.S. PATENT DOCUMENTS

| | | | |
|---|---|---|---|
| 5,680,122 A | 10/1997 | Mio | |
| 6,032,097 A | 2/2000 | Iihoshi et al. | |
| 7,304,589 B2 | 12/2007 | Kagawa | |
| 8,077,077 B2 | 12/2011 | Sakuma | |
| 8,352,111 B2* | 1/2013 | Mudalige | 701/24 |
| 8,352,112 B2* | 1/2013 | Mudalige | 701/24 |
| 2010/0256836 A1 | 10/2010 | Mudalige | |
| 2010/0256852 A1 | 10/2010 | Mudalige | |
| 2013/0218365 A1* | 8/2013 | Caveney et al. | 701/1 |

OTHER PUBLICATIONS

Gazis, D.C. et al. Nonlinear follow-the-leader models of traffic flow. *Operations Research*, 9:545-567, 1961.
Treiber, M. et al. Congested traffic states in empirical observations and microscopic simulations. *Physical Review E*, 62(2):1805-1824,2000.
Treiber, M. et al. Delays, inaccuracies and anticipation in microscopic traffic models. *Physica A*, 2005.
Brackstone, M. and M. McDonald. Car-following: a historical review. *Transportation Research Part F*, 2:181-196, 1999.
Hindmarsh, A.C. and R. Serban. User documentation for CVODES, an ODE solver with sensitivity analysis capabilities. *Lawrence Livermore National Laboratory*, UCRL-MA-148813, 2002.

(Continued)

*Primary Examiner* — Rami Khatib
(74) *Attorney, Agent, or Firm* — Gifford, Krass, Sprinkle, Anderson & Citkowski, P.C.

(57) ABSTRACT

A platoon model allows improved prediction of preceding vehicle future state. In this context, the preceding vehicle is a vehicle immediately ahead of the host vehicle, and the dynamic state of the preceding vehicle was predicted based on data received from one or more vehicles in the platoon. The intelligent driver model (IDM) was extended to model car-following dynamics within a platoon. A parameter estimation approach may be used to estimate the model parameters, for example to adapt to different driver types. An integrated approach including both state prediction and parameter estimation was highly effective.

13 Claims, 8 Drawing Sheets

(56) References Cited

OTHER PUBLICATIONS

Zhao, H. and V.A. Mousseau. Use of forward sensitivity analysis method to improve code scaling, applicability, and uncertainty (CSAU) methodology. *8th International Topical Meeting on Nuclear Thermal-Hydraulics, Operation and Safety*, Shanghai, China, Oct. 10-14, 2010.

Schön, T.B. et al. System identification of nonlinear state-space models. *Automatica*, 47(1), 2011.

* cited by examiner

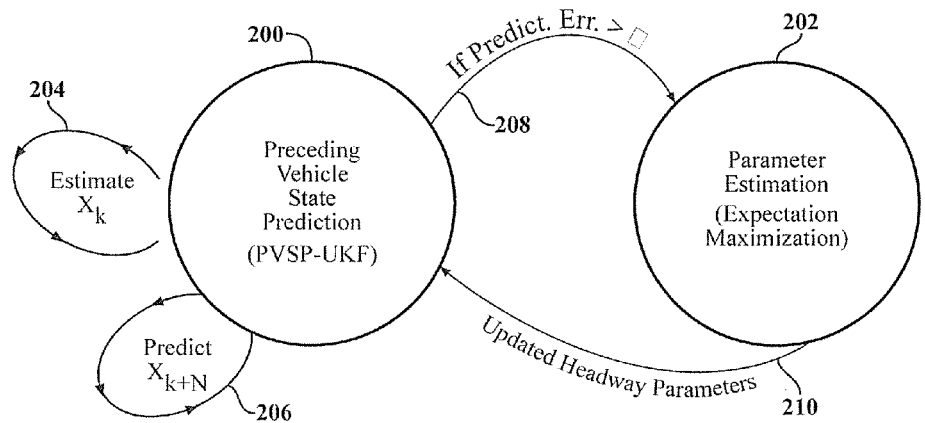
FIG. 5
FIG. 6
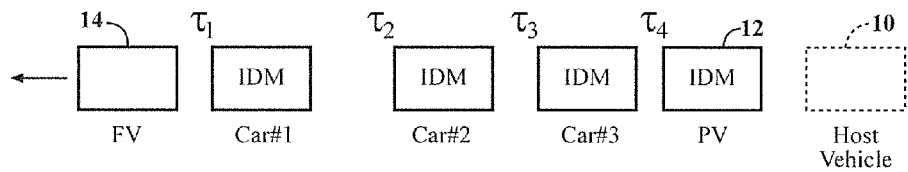
FIG. 7A
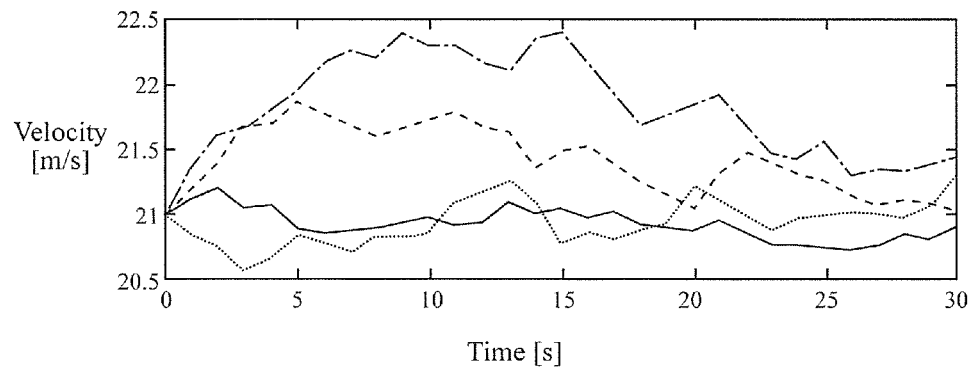

PRECEDING VEHICLE STATE PREDICTION

FIELD OF THE INVENTION

This invention relates to methods and apparatus for assisting the human or electronic driver of a host vehicle, in particular through predicting the future position and velocity trajectory of a preceding vehicle.

BACKGROUND OF THE INVENTION

Adaptive cruise control (ACC) is used to maintain a desired cruise velocity of a host vehicle, or a safe distance from a preceding vehicle. However, in dense traffic the preceding vehicle may undergo considerable velocity changes, necessitating similar velocity changes in the vehicle. It would be advantageous to smooth out such velocity changes, allowing a more comfortable driving experience.

SUMMARY OF THE INVENTION

Examples of the invention include apparatus and methods that allow prediction of the future position and velocity of a preceding vehicle. Such predictions can be used as feed forward data in an improved adaptive cruise control system. The position and velocity trajectory of a preceding vehicle is predicted using data collected from one or more vehicles ahead of the host vehicle. Such vehicle data may include position, velocity and acceleration, and allow improved control of the host vehicle's velocity and acceleration. This allows reduced fuel consumption, smoothing out traffic flow, and increased traffic throughput of a road section.

Examples of the present invention use data received from one or more vehicles ahead of a host vehicle, including a forward vehicle. The vehicle furthest from the host vehicle in the platoon of vehicles under consideration is called a forward vehicle. The preceding vehicle is the vehicle immediately ahead of the host vehicle. For example, the forward vehicle may be the leader of a platoon. In this context, a platoon of vehicles is a relatively closely spaced row of vehicles, where the dynamic property of each vehicle, except (possibly) the forward vehicle, is influenced by the behavior of the vehicle ahead in the platoon. Examples of the present invention allow prediction of the dynamics of the preceding vehicle, immediately ahead of the host vehicle, even without measurements from all the vehicles ahead.

A dynamic platoon model is developed for predicting the future state of the preceding vehicle. The platoon model captures dynamic response of vehicles following another vehicle in traffic. For example, if the forward vehicle reduces speed, the velocity disturbance propagates backwards through a line of closely spaced vehicles, causing the preceding vehicle to slow down. This then necessitates slowing down of the host vehicle. Highly advantageous aspects of the present invention may include the ability to anticipate the slowing of the preceding vehicle, and to provide vehicle control inputs in advance of that slowing down. For example the host vehicle may begin to coast, or in some examples brake, in anticipation of a predicted slowdown of the preceding vehicle. This allows velocity changes of the host vehicle to be smoothed out over time, and reduces the discomfort to the driver and increases fuel economy.

Dynamic data from the forward vehicle, and one or more other vehicles in the platoon, is received by the host vehicle and processed to an improved model of the vehicle platoon. The forward vehicle may be the foremost vehicle in a platoon, or may otherwise be chosen as some number of vehicles ahead of the host vehicle and the preceding vehicle in traffic.

The choice of forward vehicle may be influenced by the range of vehicle-to-vehicle communications used in some embodiments. In typical platoon models, the forward vehicle may be assumed to be dynamically unconstrained. However, in examples of the present invention there is no need for an actually unconstrained forward vehicle.

An improved mathematical model for a vehicle platoon was developed. The platoon is modeled as a group of vehicles traveling in the same lane, such that each vehicle is dynamically influenced by the vehicles ahead of it. Hence, platoon dynamics are coupled. A model is developed assuming that drivers of the vehicles do not have anticipation, that is the acceleration or deceleration response is influenced only by their preceding vehicle. The model includes interaction dynamics between the various pairs of following vehicles within the platoon. The intelligent driver model (IDM) was used for the longitudinal dynamics of the leader-follower vehicle pairs. However, other models may be used. The platoon model allows prediction of the platoon behavior. The predicted behavior can be compared against actual behavior and the model optimized dynamically. Excellent results were obtained using a Kalman filter, though other mathematical approaches may be used. Measurements may be received by the host vehicle through wireless vehicle-to-vehicle communications, and other data from sensors including roadside sensors, and also from radar sensors supported on the host vehicle or other vehicle within the platoon.

Hence, for the first time, the intelligent driver model was extended from a single pair of leader-follower vehicles to a whole platoon of vehicles. Parameters were attached to each vehicle that reflects variation in vehicle and driver behavior. These parameters may initially be average parameters, but may be updated in real time as further data is collected, using a parameter estimation method. The parameter estimation method can be used to modify and improve model behavior as time progresses.

A multi-parameter model was developed using parameters such as the target cruise velocity, headway, maximum acceleration parameter, and the velocity and position of each vehicle. Optimization of all parameters used may be intractable, particularly using currently available vehicle electronics, so a novel approach was developed in which only the most sensitive parameters were optimized by a parameter estimation method. The two most sensitive parameters were found to be the target cruise velocity and headway. The target cruise velocity may be assumed to be the speed limit of the road, and this may be determined by GPS, other positioning system, or otherwise estimated from previous vehicle behavior. Hence, examples of the present invention include a single parameter approach to model optimization, in which only the headway was optimized. It was found to be sufficient to estimate only the headway parameter using the parameter estimation technique, if the target cruise velocity was known or otherwise determined.

As vehicles enter and leave the platoon, the parameters for each vehicle in the platoon may be modified as a function of time, and the parameter estimation model of the present invention can account for this. In particular, by restricting the parameter estimation model through only the headway, rapid estimation is possible. The platoon model is hence adaptive to the real-time changes in platoon dynamics.

Hence, examples of the present invention include an improved model of a vehicle platoon, which may be based on leader-follower vehicle pair models such as the intelligent driver model. Examples of the present invention also include simplification of the parameter estimation algorithm by estimating only the more sensitive parameters, such as headway and target velocity, for each vehicle in the platoon. In some examples, only the headway parameter need be estimated. The estimated headway parameter may then be used to adapt to different driver and vehicle types encountered in real-time traffic, thereby improve preceding vehicle state-prediction accuracy.

Predicted states of the platoon (position and velocity of each vehicle) from past measurements may be compared with estimated and measured states at the current time to determine a model mismatch. If a numerical error between predicted and estimated or measured states exceeds a predetermined numeric threshold, a model mismatch state may be identified. This may then be used to trigger execution of a parameter estimation algorithm. The model mismatch detection feature allows parameter estimation to be executed asynchronously, on an as-needed basis, thus reducing computational burden on the electronic circuits.

Improved models give good results even in cases where only a partial set of platoon vehicle measurements is available. The method may perform acceptably even in low penetration vehicle-to-vehicle scenarios, where not every vehicle is in communication with each other. This is a great advantage, because if vehicle-to-vehicle technology is introduced, there will likely be a large number of, for example, older vehicles without this capability. The methods described herein work extremely well even in low penetration cases.

Extending a simple preceding-following pair of cars model to the whole platoon requires parameters to be assigned to each vehicle. A full model requires a large number of parameters and may be computationally intractable. The model was simplified by analysis to identify the more influential parameters, such as the headway parameter. The headway parameter may be adaptively adjusted during host vehicle's progress, allowing the platoon model to be dynamically adjusted, for example as vehicles leave or enter the platoon and change the platoon dynamics.

An advantage of expectation maximization (EM) methods is that they were found to give excellent results even when only partial platoon data was available. For example, in a lane of cars on a road, only a fraction of the platoon may be capable of transmitting data to the host vehicle. Hence no measured data is available for the other vehicles. However, the present approach was able to adjust for the missing data and still provide excellent predictive properties.

The host vehicle may receive data from other vehicles in the platoon, for example using shortwave wireless communications such as vehicle-to-vehicle communications. The host vehicle may also receive data from sensors on the host vehicle, such as radar, lidar, imaging sensors, or other sensors. Data may also be received from wireless communication networks such as the Internet, or networks local to the road. Data may be received directly or through a network from roadside sensors. Further, GPS sensors, digital maps and road-speed-limit database may be used to provide speed limit data, or road data of other types. Examples of the present invention include an improved adaptive cruise control (ACC) that uses the predictive approaches of the present invention to allow anticipatory control inputs to the vehicle. In a conventional ACC, a vehicle may only start to slow once the vehicle ahead slows. This type of behavior allows speed fluctuations to propagate along a vehicle platoon. However, using the predictive approaches, the host vehicle may start to slow before there is any change in the preceding vehicle speed. This allows speed changes to be smoothed out generally, and is of benefit to both the host vehicle and more broadly to vehicle throughput along a road.

A vehicle platoon may be considered as a line of vehicles on a road, having a front vehicle which may have freedom to travel any desired speed, and following vehicles which are influenced by the vehicle immediately ahead. The host vehicle follows the preceding vehicle, and hence the dynamic state of the host vehicle is conventionally influenced only by the preceding vehicle. However, using the improved models described herein, the dynamic state of the host vehicle can be adjusted based on a predicted state of the preceding vehicle. The state of the preceding vehicle may be predicted up to a period few seconds into the future, or tens of seconds ahead, for example in the range 0 to 20 seconds in the future, such as between 0 and 5 seconds in the future.

The improved approaches described here may select a forward vehicle based on a variety of parameters, such as the wireless range of communication sensors. Hence the definition of a platoon may be somewhat arbitrary within dense traffic. The forward vehicle may have a vehicle ahead of it influencing the behavior of the forward vehicle. However, the improved models described herein may arbitrarily select a forward vehicle ahead of both the host vehicle and preceding vehicle. There is no need for an unconstrained forward vehicle using the described approaches. For example the forward vehicle could be selected as some number of vehicles ahead of the host vehicle, for example between two and ten vehicles ahead of the host vehicle. The vehicle immediately ahead of the host vehicle is termed the preceding vehicle. Clearly, selecting the preceding vehicle as the forward vehicle would not allow any prediction to be made.

Examples of the present invention include an improved cooperative adaptive cruise control (C-ACC) system that predicts the future position and velocity of the preceding vehicle in a platoon. Using a more accurate predictive model of a dynamic vehicle platoon allows improvement in ride comfort, fuel economy, and overall vehicle throughput of a road section. The position and velocity of the preceding vehicle are predicted by modeling the platoon using the Intelligent Driver Model (IDM) and continually evaluating the performance by comparing the estimated parameters to actual platoon characteristics. The model may be dynamically updated by evaluating the estimated parameters relative to actual platoon measurements.

Examples of the present invention include apparatus and methods in which data is received from one or more of a variety of sensors, such as short range wireless communication, the Internet, radars, laser sensors, lidar, electro-optical sensors, roadside sensors, and data from any such sensor supported by vehicles or other installations in radio communication with the host vehicle.

BRIEF DESCRIPTION OF THE FIGURES

FIG. 5 shows an improved method of preceding vehicle state prediction, using an aperiodic parameter estimation algorithm.

FIG. 6 shows an example platoon configuration used for simulations.

FIGS. 7A to 7D show the platoon measurements used and estimated headway parameter convergence using IDM simulated platoon data and full state measurement.

DETAILED DESCRIPTION OF THE INVENTION

Examples of the present invention include apparatus and methods for predicting the state of a preceding vehicle. In this context, the preceding vehicle is a vehicle immediately ahead of a host vehicle, the host vehicle and preceding vehicle being part of a vehicle platoon. A vehicle platoon is an arrangement of vehicles, typically within a single lane of a road, in which the behavior of any vehicle is affected by the vehicle in front of it. The vehicle platoon has a forward vehicle, which may be assumed to have an independent state; equivalently, forward vehicle's speed-profile is arbitrary in nature.

Examples of the present invention allow the speed and position of a preceding vehicle to be predicted, allowing anticipatory changes of the host vehicle speed-profile. For example, the host vehicle may slow down, for example through coasting and/or braking, in anticipation of a slowing of the preceding vehicle. This allows a reduction in the accelerations and decelerations needed by the host vehicle, giving a smoother ride and improved fuel economy, amongst other benefits.

A novel mathematical model of a vehicle platoon was developed. In an example approach, a platoon model was developed based on the intelligent driver model of a preceding-following pair of cars. A method is presented for predicting a future state (position and velocity) of the preceding vehicle in response to velocity disturbance from lead vehicle in a platoon. Online parameter estimation is used to adapt model parameters to individual driver characteristics in the platoon. A car-following model is used to model platoon longitudinal dynamics. The approach was successful with partial platoon measurements using simulated as well as real-traffic data.

Figure 1A:
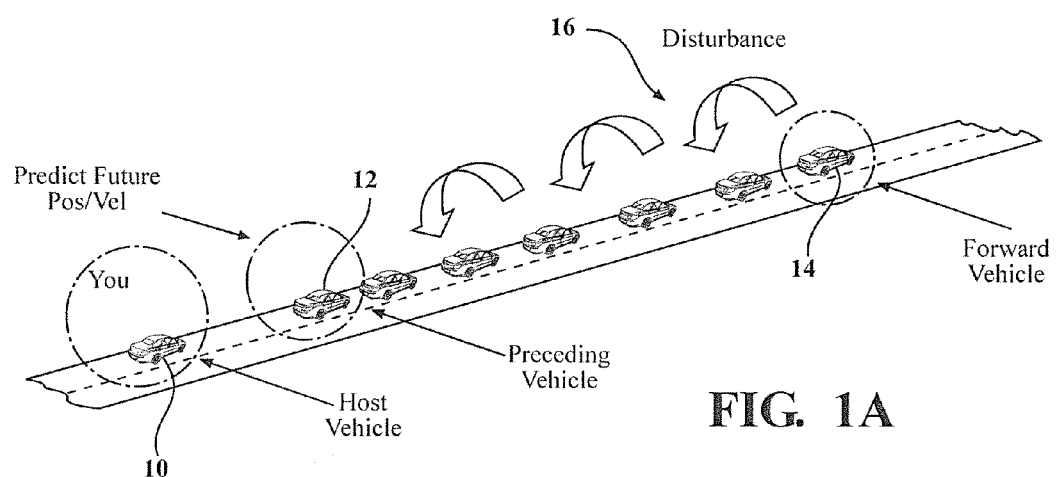
FIGS. 1A to 1C illustrate how vehicle speed fluctuations may be reduced.

FIG. 1A shows a platoon of vehicles 16, including the host vehicle 10, preceding vehicle 12, and forward vehicle 14. The arrows illustrate how a speed disturbance may propagate backwards through the platoon, and may in conventional approaches be only discovered by the driver of the host vehicle 10 when the preceding vehicle changes speed. However, using the predictive approaches described herein, the change in speed of the preceding vehicle may be predicted in advance, for example through data received from vehicles ahead of the preceding vehicle.

Figure 1B:
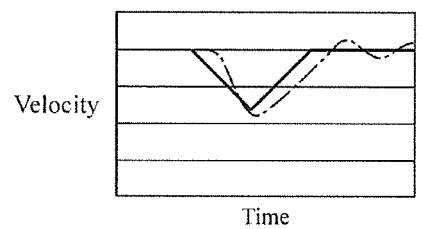

FIG. 1B shows the velocity of the host vehicle versus time, where the host vehicle reacts to the preceding vehicle state fluctuations without anticipation.

Figure 1C:
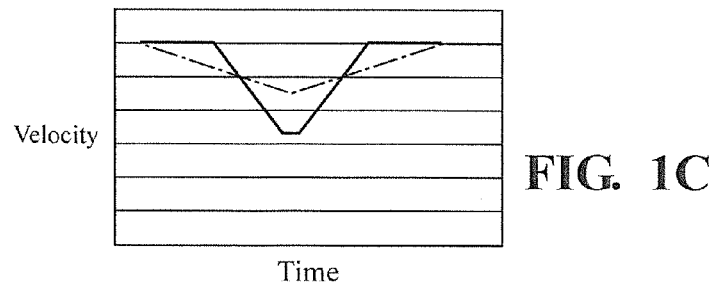

FIG. 1C shows a feedforward assist approach. The models described herein allow smaller accelerations and hence slopes to be reduced, and the overall magnitude of the speed fluctuations to be reduced. This reduces fuel consumption and driver stress, compared with the conventional approach.

The situation illustrated in FIG. 1A may occur in dense traffic situations or when vehicles are driving in an autonomous or non-autonomous platoon. Velocity disturbances from a forward (lead) vehicle propagate downstream through the platoon. If the host vehicle (also referred to as the ego vehicle) uses a conventional adaptive cruise control (ACC) system to maintain a desired cruise velocity or a safe-distance in presence of a preceding vehicle, the host vehicle may be subject to large velocity fluctuations. In this illustration, the preceding vehicle is the vehicle immediately ahead of the host vehicle.

Using sensors, such as host-vehicle based sensors, and wireless vehicle-to-vehicle (V2V) communications, the host vehicle may obtain current-time measurements from other vehicles in the platoon. The host vehicle may obtain vehicle data from other vehicles, obtained from sensors on the other vehicles, such as radar, electro-optical sensors, laser, and the like. The vehicle data may be received using wireless V2V communication, and can be used to predict future position and velocity of the preceding vehicle in response to a velocity disturbance from the forward vehicle. Examples of the present invention include methods and apparatus for providing the host vehicle with a preceding vehicle state prediction (PVSP).

Using predicted future-state information is akin to a feed-forward system. A novel improved ACC system using the preceding vehicle state prediction allows improved ride-comfort, reduced fuel-consumption, as well as improved string-stability of the platoon. A model-based approach was developed for the preceding vehicle state prediction (PVSP) problem, including dynamic modeling of the platoon. Example platoon models allow adaptation of the model to different types platoon (i.e. vehicle types or driving styles), function with partial platoon measurement, and allow real-time implementation.

A dynamic model for vehicle platoon was developed, allowing an algorithm for estimating and predicting all the states of vehicles in the platoon, including unmeasured vehicles to be developed. An integrated state-prediction and parameter estimation algorithm was also developed. Efficacy of the approach was demonstrated using simulated as well as real-traffic data.

Figure 2:
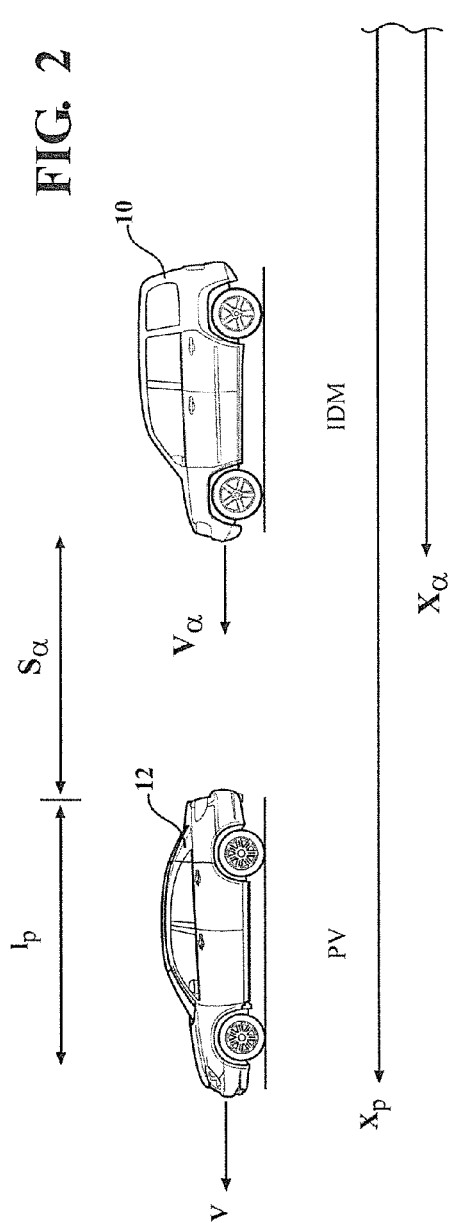
FIG. 2 shows a preceding-following pair of cars.

FIG. 2 shows the host vehicle 10 following the preceding vehicle 12. The intelligent driver model can be used to describe the relationships between the position, speed, and acceleration of the host vehicle in relation to the preceding vehicle, and extended to a platoon to give a dynamic model for the platoon. The platoon comprises a forward vehicle, at the head of the platoon, the host vehicle, a preceding vehicle (the vehicle immediately ahead of the host vehicle), and other platoon vehicles.

A platoon may be considered as group of vehicles traveling in the same lane such that each vehicle is dynamically influenced by the vehicle ahead of it. Thus by definition, platoon dynamics are coupled. A model may assume that drivers do not have anticipation, i.e. driver acceleration or deceleration response is influenced only by the vehicle immediately ahead.

Longitudinal dynamics of leader-follower vehicle pairs, known as car-following models, have been extensively researched in the literature. There numerous empirical or semi-empirical models available, including the Gipps model (P. G. Gipps, A behavioural car following model for computer simulation, Transportation Research B, 15:105-111, 1981), Gazis-Herman-Rothery model (D. C. Gazis, R. Herman and R. W. Rothery, Nonlinear follow the leader models of traffic flow, Operations Research, 9:545-567, 1961), intelligent driver model (IDM) (M. Treiber, A. Hennecke and D. Helbing, Congested traffic states in empirical observations and microscopic simulations, Physical Review E, 62(2), 2000), human driver model (HDM) (M. Treiber, A. Kesting and D. Helbing, Delays, inaccuracies and anticipation in microscopic traffic models, Physica A, 2005), and the like. A survey of car-following models is found in M. Brackstone and M. McDonald, Car-following: a historical review, Transportation Research Part F, 2000.

A platoon model was developed based on the IDM car-following model, but other car-following models may also be used. The IDM is a collision-free model, and model parameters have intuitive physical interpretations. An IDM model can exhibit both microscopic and macroscopic traffic-modes as observed in real-traffic.

The IDM car-following model is represented by Eqs. 1a-1b as follows, $$\dot{v}_\alpha = a\left[1 - \left(\frac{v_\alpha}{v_0}\right)^4 - \left(\frac{s^*}{s}\right)^2\right] \quad (1a)$$
$$= f(x_\alpha, v_\alpha, x_p, v_p)$$

$$\dot{x}_\alpha = v_\alpha \quad (1b)$$

where, $$s^* = s_0 + v_\alpha \tau + \frac{v_\alpha \Delta v}{2\sqrt{ab}}$$
$$s = x_p - x_\alpha - l_p$$
$$\Delta v = v_\alpha - v_p$$

Here, $(x_\alpha, v_\alpha)$ are the absolute longitudinal position and velocity of the host vehicle and $(x_p, v_p)$ are respective values for the preceding vehicle. The IDM has five parameters with intuitive physical interpretation, namely, maximum acceleration (a), maximum deceleration (b), target cruise velocity ($v_0$), jam-distance ($s_0$) and headway time ($\tau$). These parameters can be tuned to simulate a gentle, average, or aggressive driving style.

Since the forward vehicle $(x_1, v_1)$ in the platoon has no vehicle ahead of it, the vehicle is dynamically unconstrained, and thus, is modeled a free agent with arbitrary longitudinal acceleration ($a_1$). Forward vehicle acceleration ($a_1$) is considered as input to the platoon-system. Using Eqs. 1a and 1b, one can write the dynamics of a platoon with n-vehicles as follows.

$$\frac{d}{dt}\begin{pmatrix} v_1 \\ x_1 \\ v_2 \\ x_2 \\ \vdots \\ v_n \\ x_n \end{pmatrix} = \begin{pmatrix} 0 \\ v_1 \\ f_2(.) \\ v_2 \\ \vdots \\ f_n(.) \\ v_n \end{pmatrix} + \begin{pmatrix} 1 \\ 0 \\ 0 \\ 0 \\ \vdots \\ 0 \\ 0 \end{pmatrix} a_1 \quad (2)$$

Figure 3:
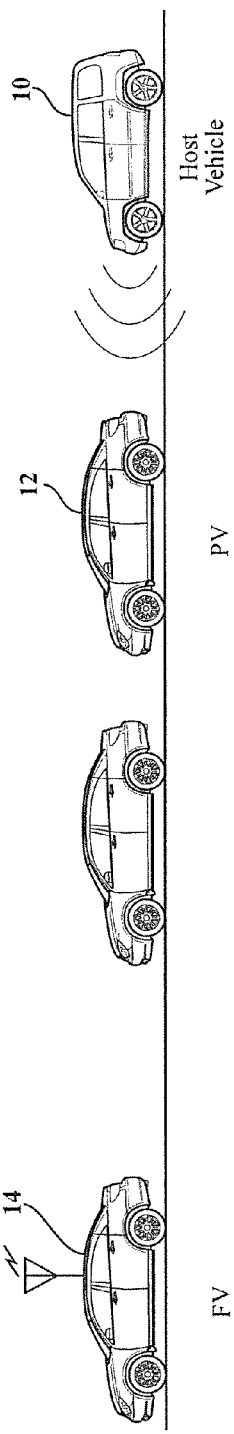
FIG. 3 illustrates a vehicle platoon including the host vehicle, preceding vehicle (PV), and forward vehicle (FV).

FIG. 3 shows a platoon including the forward vehicle 14, preceding vehicle 12, and host vehicle 10. Vehicle measurements received via wireless communication data by the host vehicle 10 from the forward vehicle 14 may be used to predict changes in the state of the preceding vehicle 12. Data may be received from one or more intervening vehicles between the preceding vehicle and the forward vehicle. Data is not required from any specific vehicle between the forward vehicle and the host vehicle, except the forward vehicle itself. Vehicle-to-vehicle communication is not required from the preceding vehicle. Measurements of the preceding vehicle may be obtained using host vehicle based sensors, for example, radar, camera, lidar and other sensors.

An advantage of the prediction algorithm is that it works in real-world situations, where full-platoon measurement may be unavailable. An estimator is used for the unmeasured states, and in an example approach, a Kalman filter is used. Other estimation methods may be used. An unscented Kalman filter (UKF), was formulated to estimate the position and velocity states of vehicles in the platoon, using a platoon model as described above. The UKF is described in D. Simon, Optimal state estimation: Kalman, $H_\infty$ and nonlinear approaches, First Edition, Wiley-Interscience, 2006.

Future prediction of states was obtained by solving Eq. 2 over time prediction time-horizon using UKF state estimates initial conditions at current time-instant, $t_k$. The combined state estimation and prediction algorithm is called the PVSP algorithm.

Parameter sensitivity analysis of the IDM car-following model allowed the complexity of the parameter estimation problem to be reduced. Sensitivity analysis identified the IDM model parameters that the model dynamics are most sensitive to. A vehicle platoon may be composed of different driver types. Using fixed parameters in the PVSP algorithm introduces significant estimation and prediction errors. An online parameter estimation algorithm may be designed for the parameters which have most significant influence. Attempting to estimate all the parameters in a platoon may be mathematically an ill-posed problem, as there are 5n parameters, n being the number of vehicles in the platoon. Estimating only one or two most-important parameters for each driver helps in this regard.

Forward sensitivity analysis (FSA) was used for sensitivity investigation, which is described in A. C. Hindmarsh and R. Serban, User documentation for CVODES: An ODE solver with sensitivity analysis capabilities, Lawrence Livermore National Laboratory, UCRL-MA-148813, 2002, and H. Zhao and V. A. Mousseau, Use of forward sensitivity analysis method to improve code scaling, applicability, and uncertainty (CSAU) methodology, 8th International Topical Meeting on Nuclear Thermal-Hydraulics, Shanghai, Operation and Safety, Oct. 10-14, 2010. Other techniques like the adjoint sensitivity analysis may also be used.

Consider a nonlinear ODE, $$\frac{dy(t)}{dt} = \dot{y}(t) = f(y, p) \quad (3)$$

where, output $y \in \mathbb{R}^n$, model parameters $p \in \mathbb{R}^m$, and the time function $t \in \mathbb{R}$ function is $f: \mathbb{R}^n \times \mathbb{R}^m \mathbb{R} \mapsto^n$. Defining the sensitivity of output $y_i$ with respect to parameter $p_j$ as, $$s_{ij}(t) \triangleq \frac{dy_i(t)}{dp_j} \quad (4)$$

From Eqs. 3 and 4, $$\frac{d}{dp_j}(\dot{y}_i(t)) = \frac{ds_{ij}}{dt} \quad (5)$$
$$= \frac{\partial f_i}{\partial y}\left(\frac{dy_i}{dp_j}\right) + \frac{\partial f_i}{\partial p_j}$$
$$= \frac{\partial f_i}{\partial y}s_{ij} + \frac{\partial f_i}{\partial p_j}$$

To obtain the trajectory of the sensitivity states ($s_{ij}$), one must solve an augmented nonlinear system of equations based on the original ODE (Eq. 3) and sensitivity differential equation (Eq. 5). Defining the augmented states $Y \in \mathbb{R}^{(l+m)n}$ of this system as, $$Y \triangleq [y_1 \ldots y_n \, s_{11} \, s_{12} \ldots s_{nm}]^T$$

the augmented system, F(.) is given by, $$F(Y, p) = \begin{pmatrix} f \\ J_1 s_{11} + \frac{\partial f_1}{\partial p_1} \\ \vdots \\ J_1 s_{1m} + \frac{\partial f_1}{\partial p_m} \\ \vdots \\ J_n s_{n1} + \frac{\partial f_n}{\partial p_1} \\ \vdots \\ J_n s_{nm} + \frac{\partial f_n}{\partial p_m} \end{pmatrix} \quad (6)$$

where, $$J_i = \frac{\partial f_i}{\partial y}$$

is the Jacobian of the original system with respect to the states. Eq. 6 can be solved for given initial conditions, $t_0=0$, $y_0=y(t_0)$ and $$s_{ij}(t_0) = \frac{d y_{0_i}}{d p_j}.$$

Given initial IDM states, the initial conditions for sensitivity states are obtained from $$s_{ij}(t_0) = \frac{d y_{0_i}(p)}{d p_j}.$$

Position and velocity trajectories of the preceding vehicle are independent variables for the problem. The parameters in the IDM car-following model represent different physical quantities with corresponding units and magnitudes, thus it is important to non-dimensionalize the parameters in the model, Eq. 1.

The analysis has limitations, including trajectory choice and nonlinearity. Sensitivity of the IDM parameters is computed along a nominal IDM state trajectory, which is a function of the preceding vehicle trajectory. A different choice of preceding vehicle trajectory may result in a different sensitivity outcome depending on which parameters are most excited by a particular preceding vehicle trajectory. However, the qualitative observations about relative influence of IDM parameters holds. The sensitivity trajectory, by definition (Eq. 4), computes the slope of IDM states with respect to a parameter on the nominal trajectory. The quantitative nature of sensitivity may change at a point far enough from the nominal trajectory by virtue of nonlinearity of IDM. One way to overcome the limitations is to use many different preceding vehicle trajectories, and compare relative outcome.

A sensitivity analysis of IDM position state with respect to the parameters showed that sensitivity to parameter $v_0$ had the highest absolute peak value of 78.3, followed by parameters $\tau$ and a with values of 52.5 and 37.8, respectively. Sensitivities to parameters b and $s_0$ were small compared to other parameters. The peak value of sensitivity to a, the maximum acceleration parameter corresponded to a period of high acceleration, which is intuitive. Sensitivity to parameter a had small values except during this period of large positive acceleration.

The IDM output was less sensitive to parameter a under most driving scenarios. RMS values from the sensitivity analysis showed that $v_0$ has the highest value of 44.6 followed by $\tau$ with 37.7 and a with 10.8. Parameters b and $s_0$ have smaller RMS values of 2.7 and 2.3, respectively. Hence from the peak and RMS values of b and $s_0$, the IDM output is least sensitive to these two parameters. From a practical standpoint, RMS of the sensitivity trajectory is a more important characteristic to consider because PVSP is concerned with errors in IDM state trajectory (i.e. position and velocity) over the entire period of the experiment. Based on the preceding discussion, the following order of parameter sensitivity can be established:

$$\underbrace{v_0}_{\text{most sensitive}} > \tau > a \gg b > \underbrace{s_0}_{\text{least sensitive}}$$

The IDM car-following model was found to be most sensitive to target cruise velocity ($v_0$) and headway ($\tau$) parameters. For the PVSP algorithm, it may be sufficient to estimate only the headway parameter ($\tau$) using a parameter estimation technique, because the parameter $v_0$ may be approximated from the speed-limit database for a particular road section, or based on the historical trend.

Parameter estimation of nonlinear dynamical systems is regarded as a hard problem. Stochastic approaches like maximum likelihood (ML) and expectation maximization (EM) offer a general framework to address such problems. The EM algorithm extends the ML framework to admit systems were only a part of the state-space is measurable. Hence, EM is a suitable candidate for estimating parameters of a vehicular platoon with partial platoon measurements.

Recently, an improvement to the EM algorithm was proposed using Bayesian filters (particle methods), as described in T. B. Schön, A. Wills and B. Ninness, System identification of nonlinear state-space models, Automatica, 47(1), 2011. An advantage of using particle-filter based approach especially in the case of nonlinear systems is that particles encapsulate exact state distribution statistics. This is in contrast to Kalman filter based approaches where a truncated approximation of the statistics is used. Expectation Maximization (EM) also offers excellent convergence and robustness properties.

Eq. 2 can be written as a parameterized nonlinear state-space model, $$x_{k+1} = f(x_k, u_k, q_k, \theta), \quad q_k \sim \mathcal{N}(0, Q) \quad (7a)$$

$$y_k = h(x_k, v_k), \quad v_k \sim \mathcal{N}(0, R) \quad (7b)$$

where $\theta = [\tau_1 \, \tau_2 \ldots \tau_p] \in \mathbb{R}_+^p$, $x \in \mathbb{R}^p$, $y \in \mathbb{R}^{2m}$ are unknown headway parameter vector, state-vector and measurement-vector, respectively, p and m are the total number of vehicles in the platoon and the measured number of vehicles, respectively, and $u_k \in \mathbb{R}$ is the input, which is forward vehicle acceleration in of Eq. 2. Also $q_k$ and $v_k$ are process and measurement noise of compatible dimensions and known distribution (Gaussian), respectively. The main idea behind the EM algorithm is that, Eq. 7 can be interpreted in probability space as, $$x_{k+1} \sim p_\Theta(x_{k+1}|x_k, u_k) \qquad (8a)$$

$$y_k \sim p_\Theta(y_k|x_k) \qquad (8b)$$

Using Markov property of Eq. 8 and Baye's rule allows joint distribution function of the measurements, $p_\Theta(y_1, y_w, \ldots, y_N)$ to be expressed as a convex function known as log-likelihood function. Nonlinear optimization can be used to find an optimum parameter vector, $\Theta^*$ that maximizes the log-likelihood function. The EM method uses joint-likelihood function, $L_\Theta(X_N, Y_N)$ instead of $L_\Theta(Y_N)$ which is based on partial state measurement. A property of the EM algorithm is that choosing $\Theta_k$ based on EM iteration guarantees that joint-likelihood function is increased in every successive iteration.

Figure 4:
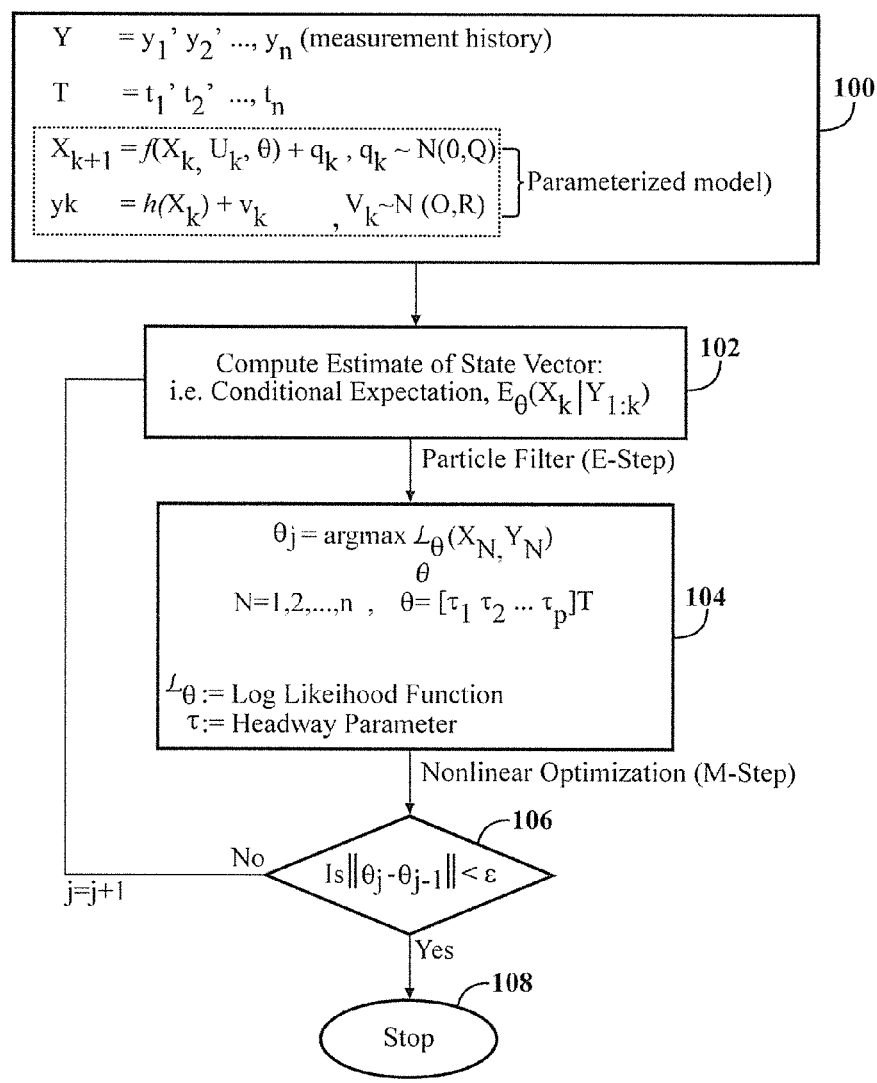
FIG. 4 shows an expectation maximum (EM) approach used for headway parameter estimation.

FIG. 4 shows a flowchart of a parameter estimation method using expectation maximization (EM) approach. Box 100 corresponds to receiving measurement data and the parameterized model from the PVSP method. This transfer of data is triggered by a threshold-logic when error in predicted states of the platoon exceeds a threshold value. Box 102 corresponds to computing an estimate of the state vector over the measurement history $(y_1, \ldots, y_n)$ based on the current estimate of headway parameters vector $(\theta_j)$. This step is based on a particle filter, other approaches may be used. Box 104 corresponds to nonlinear optimization of the parameters such that a cost-function that matches estimated states using parameter vector ($\theta$) with observed measurement history is maximized. Box 106 corresponds to checking convergence of the estimated parameter vector ($\theta$). Boxes 102 and 104 are repeated until such time when the deviation in estimated parameter vector $(\theta_j)$ compared to previous estimate $(\theta_{j-1})$ is less than a threshold value. Box 108 corresponds to stopping the expectation maximization iteration. The updated parameters are then returned to the PVSP process.

Due to high computational complexity of the EM algorithm it may not be desirable to run it concurrently with PVSP algorithm. Another execution framework includes executing the EM algorithm asynchronously or aperiodically as and when required, for example when state prediction errors become larger than a threshold $\epsilon$, indicating a significant mismatch in model parameters.

FIG. 5 shows how the PVSP process interacts with the expectation maximization approach. Box 200 corresponds to operation of the PVSP process, for example using parameter estimation to adaptively optimize a headway parameter as previously described. Arrowed loop 204 corresponds to estimation of the PV state. Box 206 corresponds to prediction of future states. These predictions can be compared with actual measurements to determine how much the PVSP process predictions differ from actual measurements, i.e. the prediction error. Box 208 corresponds to triggering execution of the expectation maximization approach once the prediction error is greater than the threshold value. The circle 202 corresponds to parameter estimation using expectation maximization, for example as shown in FIG. 7, other parameter estimation approaches may be used. Arrow 210 corresponds to returning the updated model parameters to the PVSP process. The expectation maximization approach can be run asynchronously from the PVSP process.

The integrated PVSP and EM algorithm is referred to as PVSP+ algorithm henceforth. Some salient features of the EM algorithm are as follows. EM needs to maintain most recent measurement history, and this can be easily achieved through a FIFO memory-buffer. Longer measurement history is desirable for better accuracy in parameter estimation. Although a trade-off is necessary with respect to increased memory and computational load. EM makes use of the same set of measured variables as PVSP. No additional measurements are required. EM algorithm need not finish computation in real-time. Parameter updates can be passed to PVSP algorithm when EM achieves convergence. Particle filter used in the EM algorithm is parallelizable, a feature that may be exploited using multi-core computing architectures.

FIG. 6 illustrates a platoon configuration used for example simulations. This figure includes the forward vehicle 14, previous vehicle 12, and the host vehicle 10. The headway parameters between each vehicle are shown, using the symbol $\tau$.

Headway parameters were estimated for an IDM platoon with fixed parameters, for a platoon as shown in FIG. 6 where multiple headway parameters are unknown. In this example, the platoon is a six-car platoon, although only four cars are IDMs. The forward vehicle (FV) is an independent source of velocity disturbance, and the host vehicle (or ego vehicle), is just an observer. Measurements from all vehicles are assumed to be available.

Figure 7B:
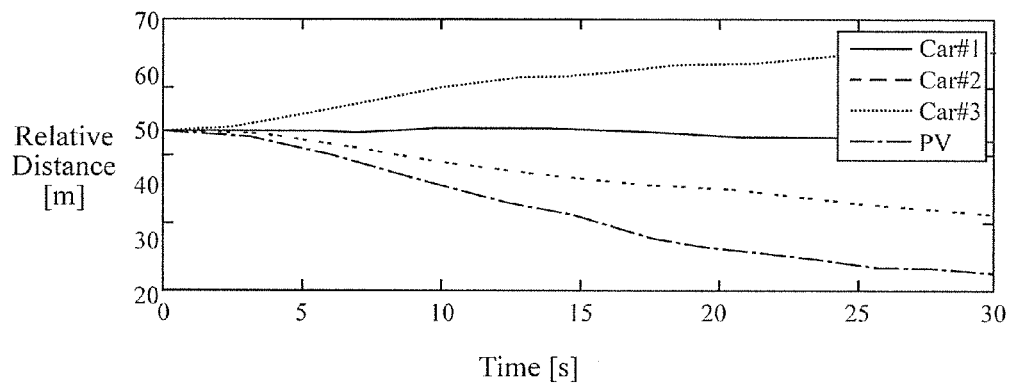

Measurement data for use with EM is obtained through simulating the IDM platoon with an arbitrary FV velocity profile. The four IDM vehicles in the platoon are assumed to have fixed but different values for the headway parameter of 2.2, 1.6, 1.0 and 0.5 seconds. Measurements are assumed to be available at 1 Hz. FIG. 7A shows measured velocity for three vehicles and the preceding vehicle, at 1 Hz sampling rate. FIG. 7B shows relative distance between the vehicles as illustrated, as a function of time.

Figure 7C:
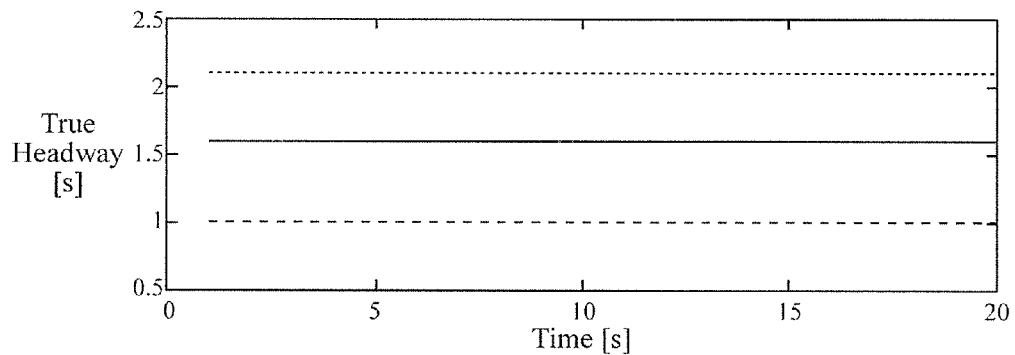
Figure 7D:
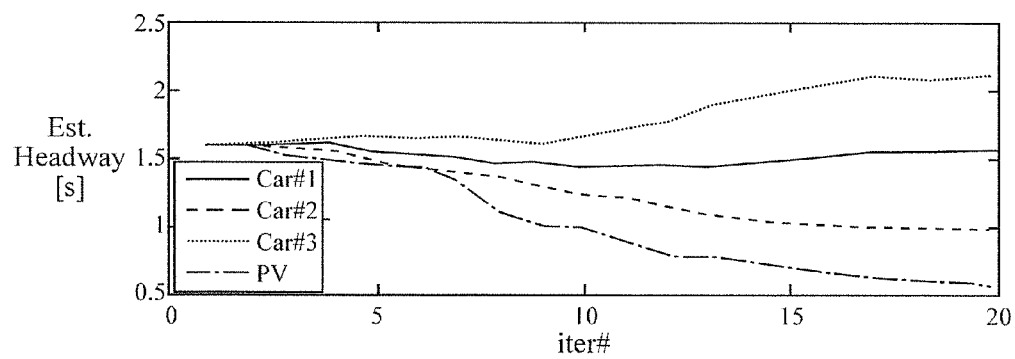

FIGS. 7C-7D show the progress of EM parameter estimator iteration. FIG. 7C shows true headway, in seconds, as a function of time in seconds. FIG. 7D shows the estimated headway parameters for the vehicles as a function of iteration. In this case there is one iteration per second, so the iteration axis matches up with the time axis of FIG. 7C. By 20 iterations, all but one parameter estimates (PV headway) have converged to the true values for all four cars. The headway parameter for the PV is also seen to be within 15% of its true value in 20 iterations.

Figure 8A:
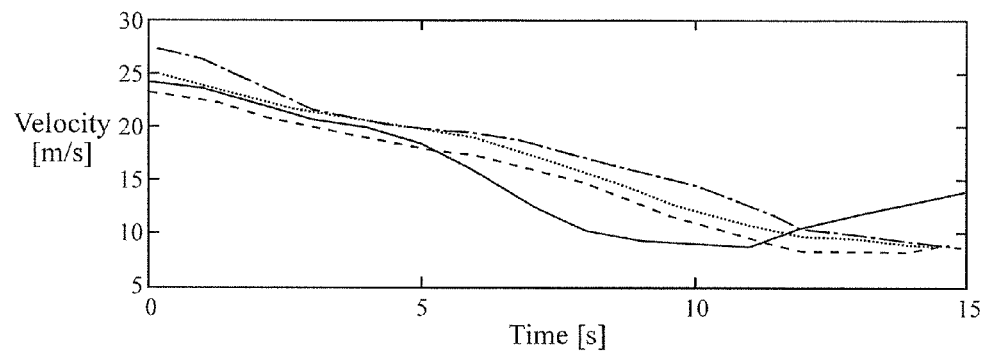
FIGS. 8A to 8D show parameter convergence using real traffic data and full state measurement.
Figure 8B:
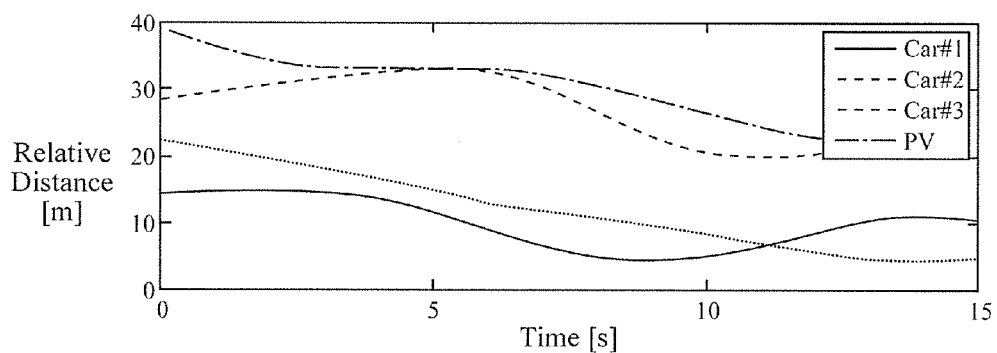
Figure 8C:
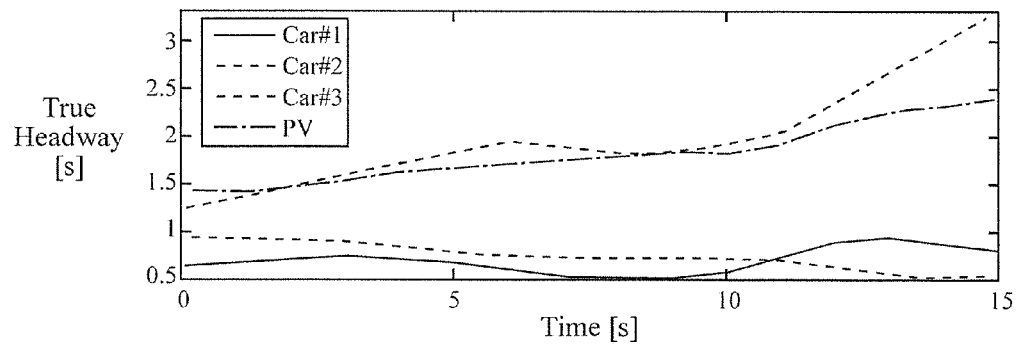
Figure 8D:
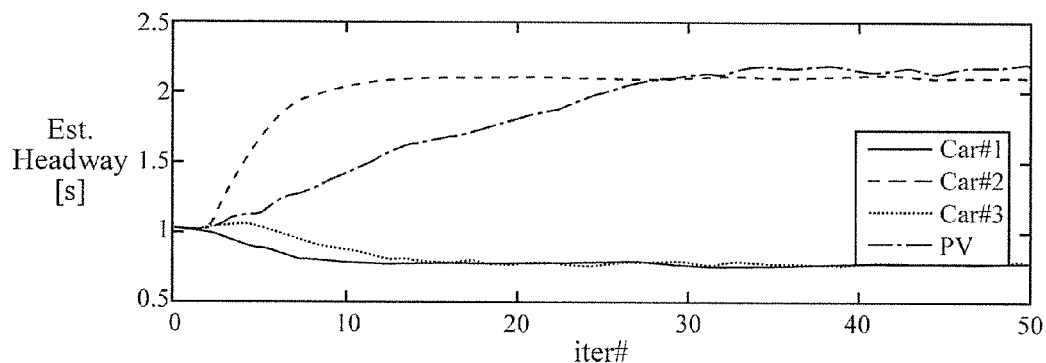

FIGS. 8A and 8B show the measured velocity and relative distance data for three vehicles and the preceding vehicle. This data-snapshot was obtained from real-traffic. FIG. 8C shows the true headway parameter for the vehicles in seconds, and FIG. 8D shows the estimated headway parameter in seconds as a function of iteration. As expected, true headway parameter in real-traffic may not be constant. The parameter estimation converges to an average value of headway over the measurement history.

Looking at the convergence behavior EM, it is observed that the parameter estimates for all vehicles converge within 14 iterations, except PV headway parameter estimate which takes about 30 iterations to converge. Significantly, the total computational cost is not larger than previous IDM platoon examples because the shorter measurement-history in this case implies that less time computation time is required to complete each iteration.

The state prediction performance of PVSP and PVSP+ algorithms were compared. The comparison of PVSP and PVSP+ algorithm is presented in terms of prediction error performance with the real-traffic data. The EM algorithm was computed independently and the estimated headway parameters from the previous example were used in the PVSP algorithm. This is equivalent to the performance of the PVSP+ approach.

Figure 9A:
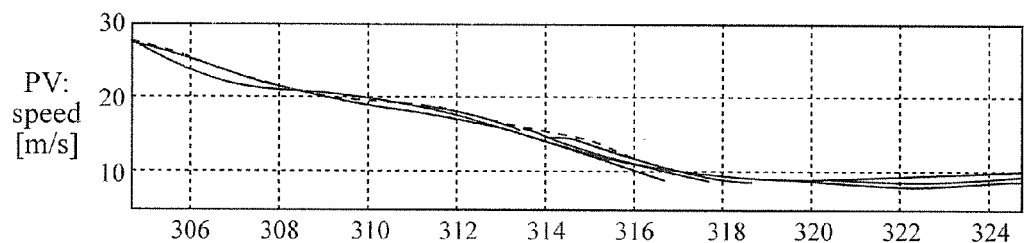
FIGS. 9A to 9F show a prediction error comparison for approaches with and without headway parameter estimation.
Figure 9B:
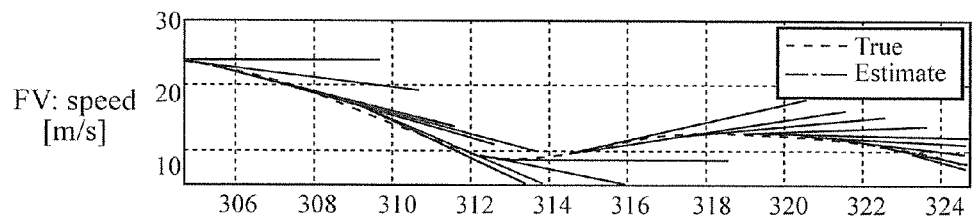
Figure 9C:
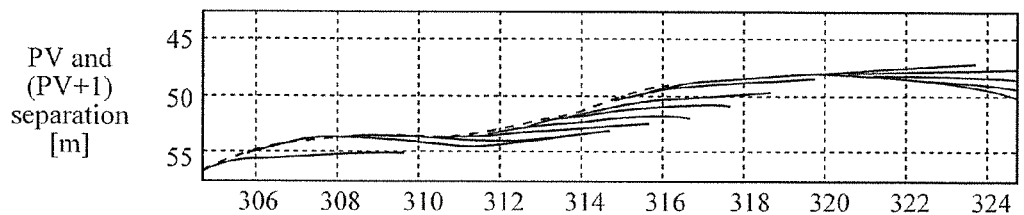

FIGS. 9A to 9F show prediction error comparisons for the PVSP process, and the PVSP process augmented with expectation maximization. FIG. 9A-C show 5-second predictions (solid black lines) at each time instant for PVSP algorithm without EM parameter estimation. Headway parameters are assumed to be fixed at 1.6 seconds for each vehicle. FIG. 9B shows the predicted speed of the forward vehicle due to constant acceleration assumption. The main deliverable of the PVSP algorithm is seen in FIGS. 9A and 9C, showing predicted speed and relative position, respectively.

Figure 9D:
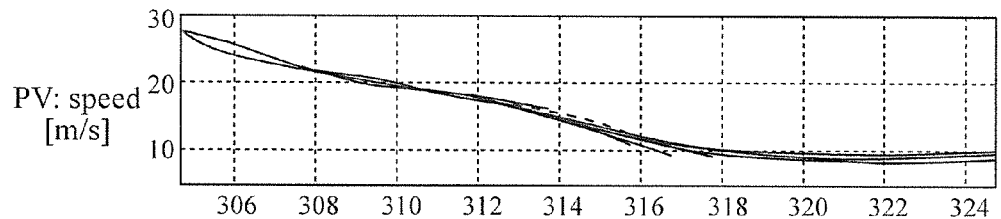
Figure 9E:
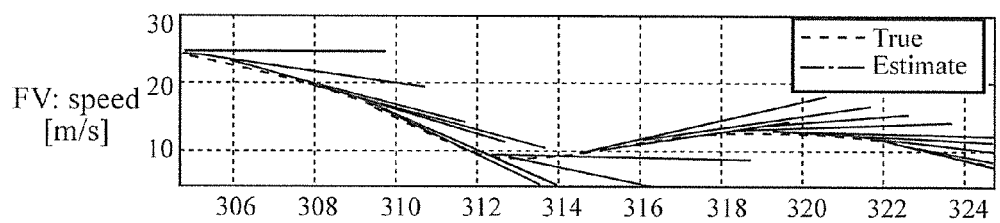
Figure 9F:
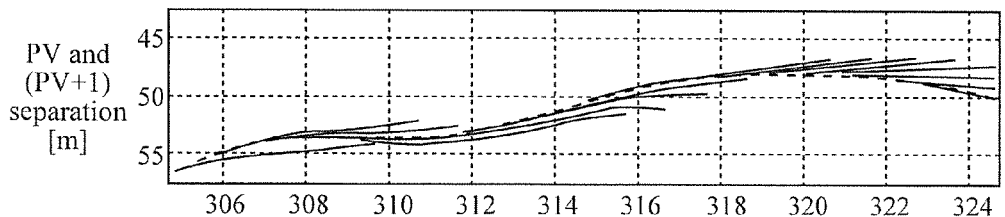

In FIGS. 9D-F, PVSP is simulated with estimated parameters obtained from the EM algorithm. A visual comparison of the figures shows a clear improvement in both predicted velocity and position of the preceding vehicle, compared with FIGS. 9A-C. In the case of full platoon state-measurement, the worst case 5-second position prediction error was reduced by 35% and the average prediction error over the entire 15 second was reduced by 45%. In partial-platoon measurement case, the worst case position prediction error was reduced by 42% and average prediction error reduced by 40%. It is apparent that PVSP+ approach offers significant performance improvements over the PVSP approach.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A method of predicting a dynamic state of a preceding vehicle within a platoon, the preceding vehicle being immediately ahead of a host vehicle, the platoon also including a forward vehicle at a foremost position of a platoon, the method comprising:
   providing a platoon model, the platoon model being a dynamic model of the platoon and having model parameters related to each vehicle in the platoon;
   estimating model parameters for the platoon;
   adaptively updating the model parameters using vehicle data received from vehicles within the platoon;
   using the platoon model to predict the dynamic state of the preceding vehicle,
   the platoon being a line of vehicles on a road, the platoon including the host vehicle, the preceding vehicle, and a forward vehicle ahead of the preceding vehicle, at the foremost position of the platoon,
   the platoon model being derived from a car-following model for each leader-follower vehicle pair in the platoon,
   the dynamic state including position and velocity of the preceding vehicle.

2. The method of claim 1, the car-following model being an intelligent driver model.

3. The method of claim 2, the model parameters for each vehicle including a maximum acceleration, a maximum deceleration, a target cruise velocity, a jam-distance, and a headway parameter.

4. The method of claim 3, target cruise velocity being determined from a known speed-limit for the road, or from historical traffic data.

5. The method of claim 3, target cruise velocity being determined from a cruise control setting for the host vehicle.

6. The method of claim 3, adaptively updating the model parameters; updating only the headway parameter for each vehicle,
   the headway parameter being headway time or headway distance.

7. The method of claim 1, the method further comprising:
   computing a state-prediction error by comparing previously predicted states with current measurements;
   executing a parameter estimation method to estimate new parameters for the platoon model, when the state-prediction error exceeds a numerical threshold.

8. The method of claim 7, parameter estimation being used to update only vehicle headway parameters.

9. The method of claim 7, updating the model parameter being performed aperiodically for adaptively updating the platoon model parameters.

10. The method of claim 1, vehicle data being received through wireless communication.

11. The method of claim 1, vehicle data being received from vehicles within the platoon through wireless vehicle-to-vehicle communication.

12. The method of claim 1, the dynamic state of the preceding vehicle being predicted at least 3 seconds in advance.

13. An apparatus, the apparatus being an adaptive cruise control for a host vehicle, the apparatus including:
   a wireless receiver, operable to receive vehicle data from vehicles ahead of the host vehicle;
   an electronic circuit, receiving the vehicle data and providing a vehicle control output to control a vehicle speed of the host vehicle,
   the electronic circuit being operable to predict the dynamic state of a preceding vehicle immediately ahead of the host vehicle when the host vehicle is in traffic, the dynamic state being predicted using a platoon model,
   the platoon model being a dynamic model having model parameters related to vehicles ahead of the host vehicle, the model parameters being estimated and then adaptively updated using the vehicle data,
   the electronic circuit using the platoon model to predict the dynamic state of the preceding vehicle, and provide the vehicle control output to modify the speed of the host vehicle in response to the predicted dynamic state of the preceding vehicle,
   the platoon model being derived from a car-following model for each leader-follower vehicle pair in the platoon, the dynamic parameters of the preceding vehicle including the speed of the preceding vehicle.

* * * * *